United States Patent [19]
Orthman

[11] Patent Number: 5,207,739
[45] Date of Patent: May 4, 1993

[54] COLLAPSIBLE GUIDE ROD ASSEMBLY FOR A TRACTOR GUIDANCE SYSTEM

[75] Inventor: Henry K. Orthman, Lexington, Nebr.

[73] Assignee: Orthman Manufacturing, Inc., Lexington, Nebr.

[21] Appl. No.: 877,786

[22] Filed: May 4, 1992

[51] Int. Cl.⁵ ............................................. A01B 63/00
[52] U.S. Cl. ........................................ 172/5; 180/131; 104/244.1; 172/26
[58] Field of Search .................. 172/2, 5, 6, 26, 233; 180/79, 131; 280/14.1; 56/10.2, 10.4; 104/244.1

[56] References Cited

U.S. PATENT DOCUMENTS

| | | | |
|---|---|---|---|
| 3,326,319 | 6/1967 | Schmidt | 172/6 |
| 3,402,784 | 9/1968 | Roberson et al. | 180/79 |
| 3,548,966 | 12/1970 | Blacket | 180/79.2 |
| 4,341,268 | 7/1982 | Hugg | 172/5 |
| 4,470,242 | 9/1984 | Swetnam et al. | 56/10.2 |
| 5,025,866 | 6/1991 | Schmidt et al. | 172/5 |
| 5,040,613 | 8/1991 | Dodd et al. | 172/5 |
| 5,088,561 | 2/1992 | Jurgena | 172/5 |
| 5,090,184 | 2/1992 | Garter et al. | 56/10.2 |
| 5,094,300 | 3/1992 | Jurgena | 172/26 |
| 5,148,873 | 9/1992 | Barnes et al. | 172/5 |

FOREIGN PATENT DOCUMENTS 2632484 12/1989 France ................................ 172/5

*Primary Examiner*—Andrew V. Kundrat
*Assistant Examiner*—Spencer Warnick
*Attorney, Agent, or Firm*—Zarley, McKee, Thomte, Voorhees & Sease

[57] ABSTRACT

A guide rod assembly is mounted on the front end of a tractor with the guide rods closely adjacent the front wheels and the crop rows to transmit steering signals to a steering guidance system. The pair of guide rods pivot from a downwardly extending parallel position upwardly toward a raised closed collapsed transport position. When the guide rods reach a horizontal position, continued upward movement by the lift arms cause the guide rods to pivot inwardly toward each other to a collapsed transport position eliminating interference with the steerable tractor front wheels.

14 Claims, 6 Drawing Sheets

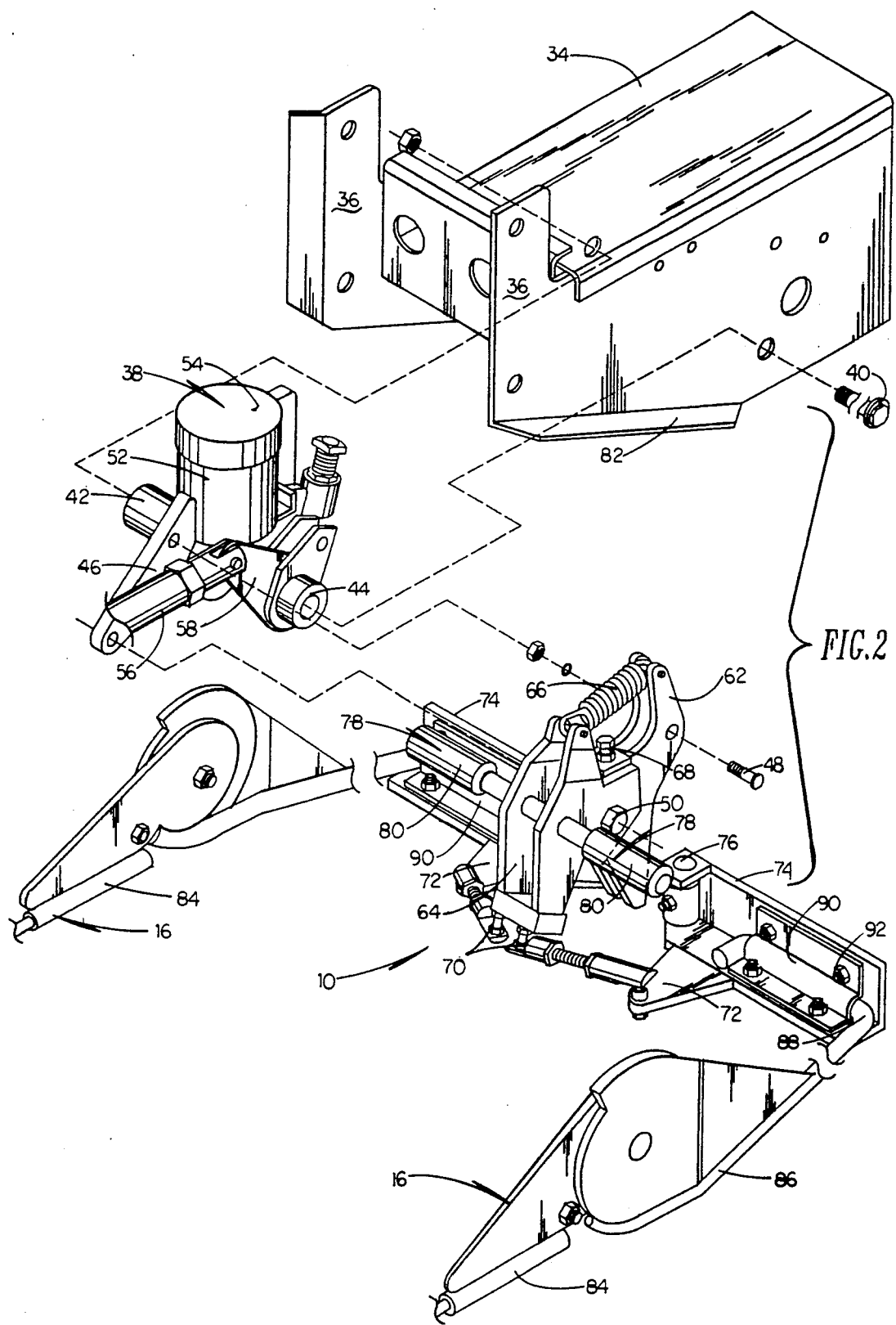

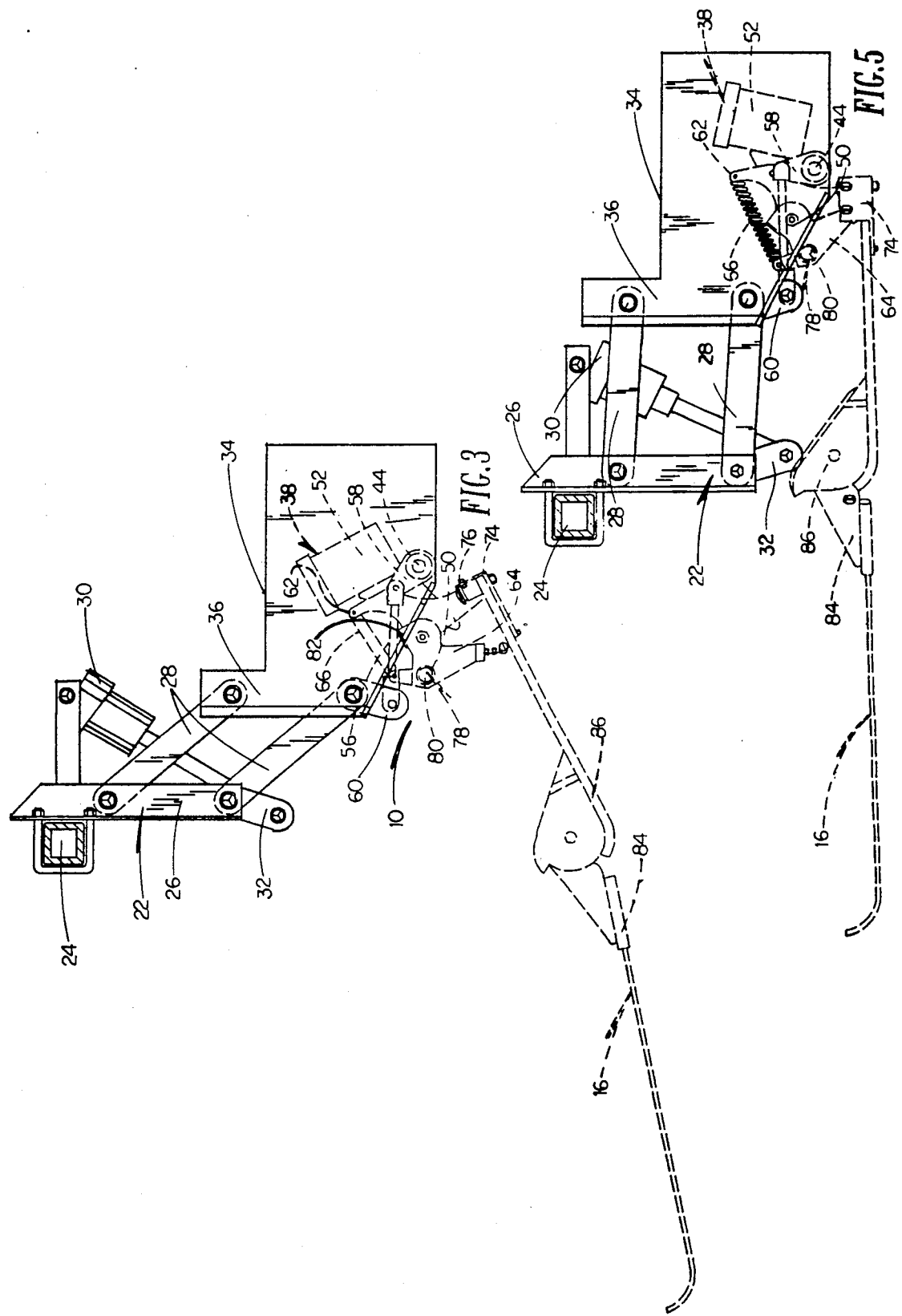

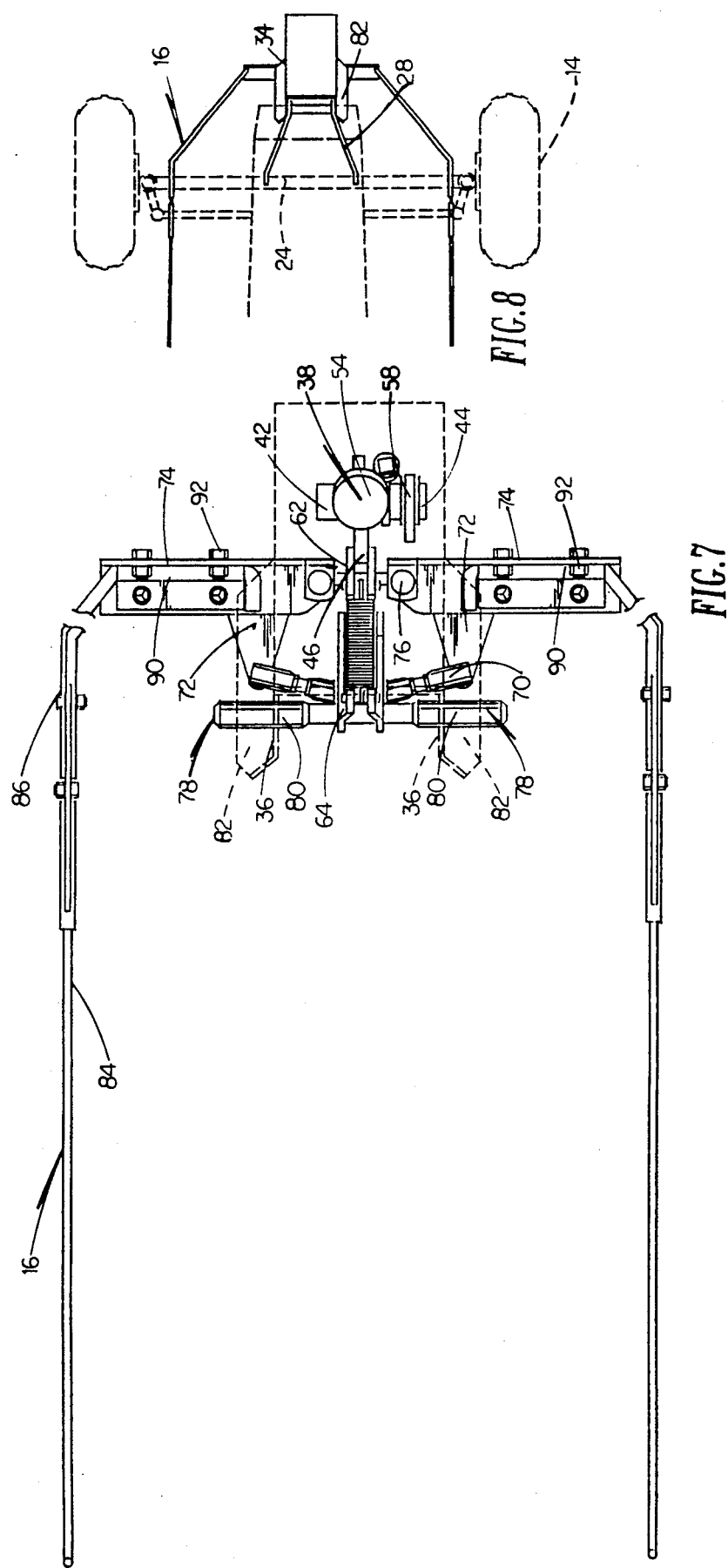

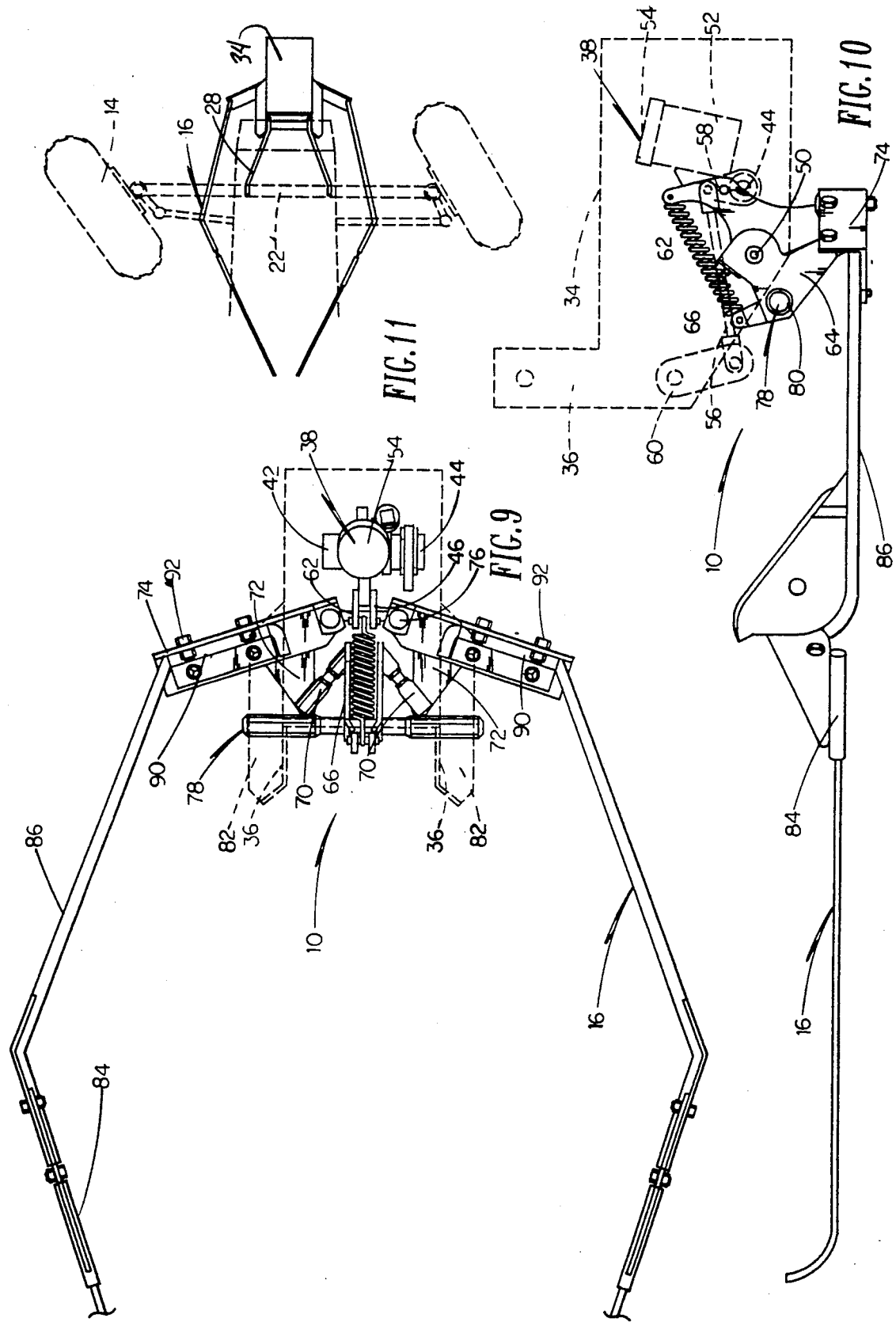

5,207,739

COLLAPSIBLE GUIDE ROD ASSEMBLY FOR A TRACTOR GUIDANCE SYSTEM

BACKGROUND OF THE INVENTION

This invention relates to a front end tractor mounted pair of guide rods that travel along the ground next to the spaced apart row crops. The steering of the tractor is electronically connected to the pair of guide rods such that it is steered in response to lateral movement of the guide rods contacting the row crops.

The problem this invention addresses is that when the guide rods are in either their lowered operative position or raised transport position, turning of the tractor front wheels will cause interference. Insufficient space is provided to turn the wheels and keep the guide rods spread apart in their parallel operative position either in their lowered or raised positions. Earlier guide rod assemblies were mounted ahead of the tractor out of the way of the front wheels but this is a much less desirable position as compared to being mounted under the tractor next to the front wheels.

It is thus the object of this invention to allow for positioning the guide rod assembly under the tractor adjacent the front wheels and yet allow for turning at the end of the rows and during transport without wheel interference.

SUMMARY OF THE INVENTION

The guide rod assembly of this invention is mounted on a lift which is positioned at the front of the end tractor. The guide rod assembly will pivot between a horizontal position and a downwardly extending position. The guide rod assembly will also pivot between a spaced apart parallel open position and a closed or collapsed position with the guide rods extending toward each other.

A coordinating means is connected between the lift and the guide rods such that when the guide rods are in their lowered downwardly extending position and they are moved toward the raised position, they will begin pivoting to the horizontal position. Once they reach the horizontal position continued upward movement toward the raised position will cause the guide rods to pivot toward each other to the closed collapsed position.

The structure that makes this possible includes oppositely extending tie rods that move back and forth between over center positions. A spring means is provided that normally biases the guide rods to their open parallel position.

The operation of the guide rod system may be manual through operation of a switch at the operator's station or automatic by virtue of being connected into the steering such that when the steering is manually overridden such as during turning at the end of a row, the raising and closing of the guide rod assembly will occur automatically.

DESCRIPTION OF THE DRAWINGS

FIG. 2 is an exploded fragmentary perspective view of the guide rod assembly.

FIG. 3 is a side elevational view of the guide rod assembly mounted on a tractor lift means and showing the guide rod assembly in its lowered downwardly extending operative position.

FIG. 5 is a view similar to FIGS. 3 and 4 but showing the guide rod assembly fully raised in the horizontal position and with the guide rods in their closed collapsed position extending toward each other.

FIG. 7 is a top plan view of the guide rod assembly in its open operative position.

FIG. 8 is a top plan view similar to FIG. 1 showing the guide rod assembly in its open position and mounted on a tractor.

FIG. 9 is a top plan view similar to FIG. 7 but showing the guide rod assembly in its closed transport position.

FIG. 10 is a side elevational view similar to FIG. 5 but without the lifting mechanism.

FIG. 11 is a fragmentary top plan view similar to FIG. 8 but showing the guide rod assembly in its closed position with the tractor wheels being turned without interference.

DESCRIPTION OF PREFERRED EMBODIMENT

Figure 1:
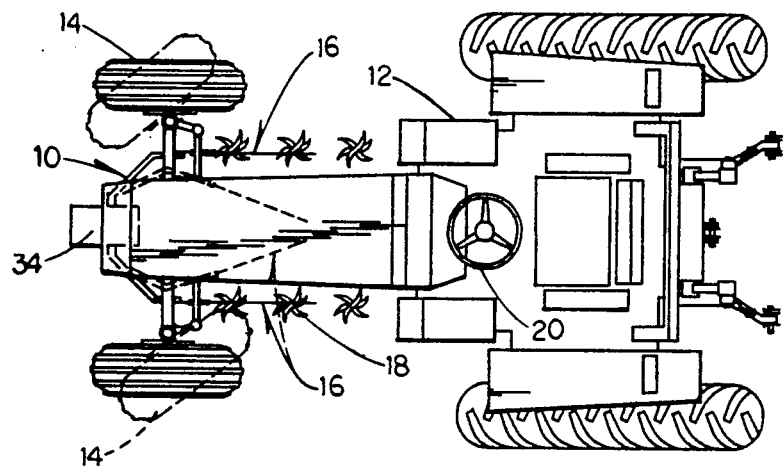
FIG. 1 is a top plan view of a tractor on which the collapsible guide rod assembly of this invention is mounted and is shown in both the lowered operative positions next to the front wheels positioned for straight ahead movement and in the raised closed position allowing the front wheels to turn without interference.
Figure 6:
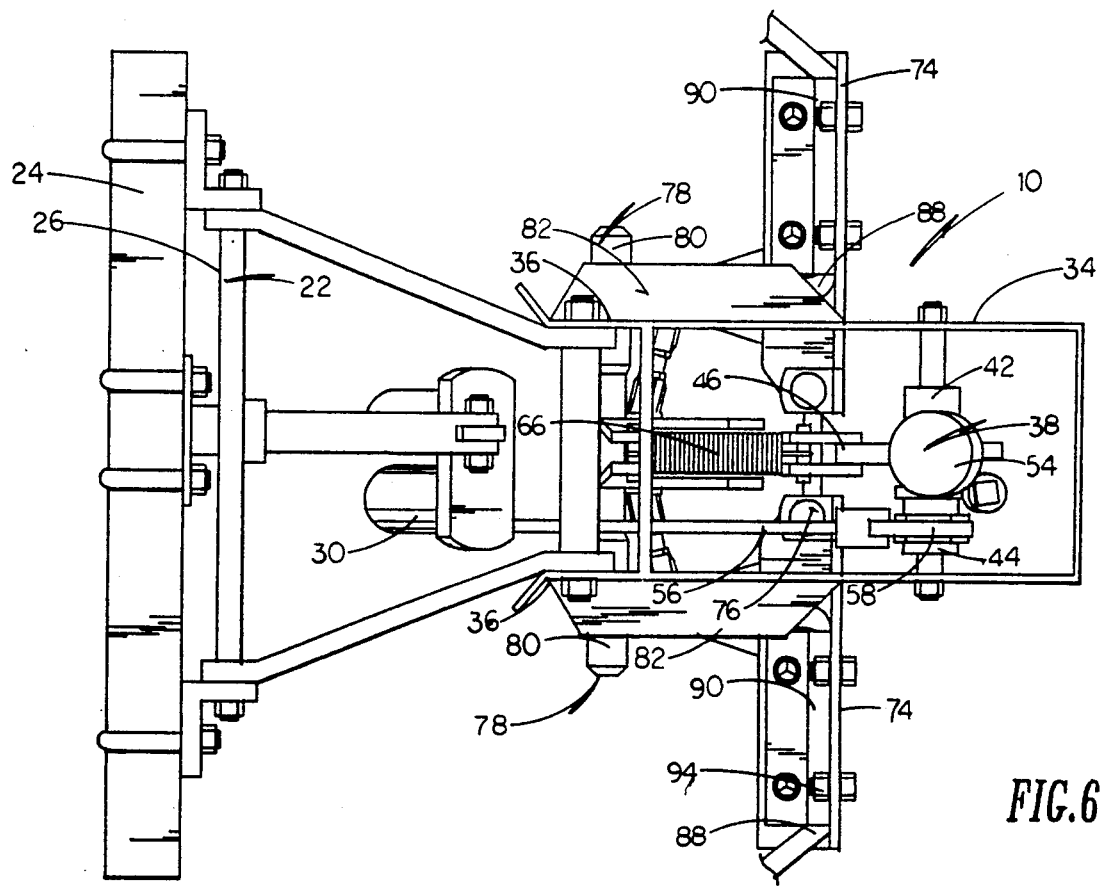
FIG. 6 is a complete top plan view of the guide rod assembly with the guide rods not shown.

The guide rod assembly of this invention is referred to generally in FIG. 9 by the reference numeral 10 and is seen in FIG. 1 mounted on the front end of a tractor 12 having steerable front wheels 14 movable between a straight ahead position and a dash line turning position. The guide rod assembly 10 has a pair of spaced apart parallel guide rods 16, when in their operative position are next to the wheels 14 and closely adjacent row crops 18.

As the tractor moves to one side or the other the guide rods 16 will engage the row crops 18 and pivot the guide rod assembly 10 sending a signal to the steering guidance system 20 (not a part of this invention) which will correct the steering to center the tractor between the rows 18.

The dash line representation in FIG. 1 of the guide rods 16 shows them in their closed transport raised position out of the way of the wheels 14 allowing them to turn without interference.

Figure 4:
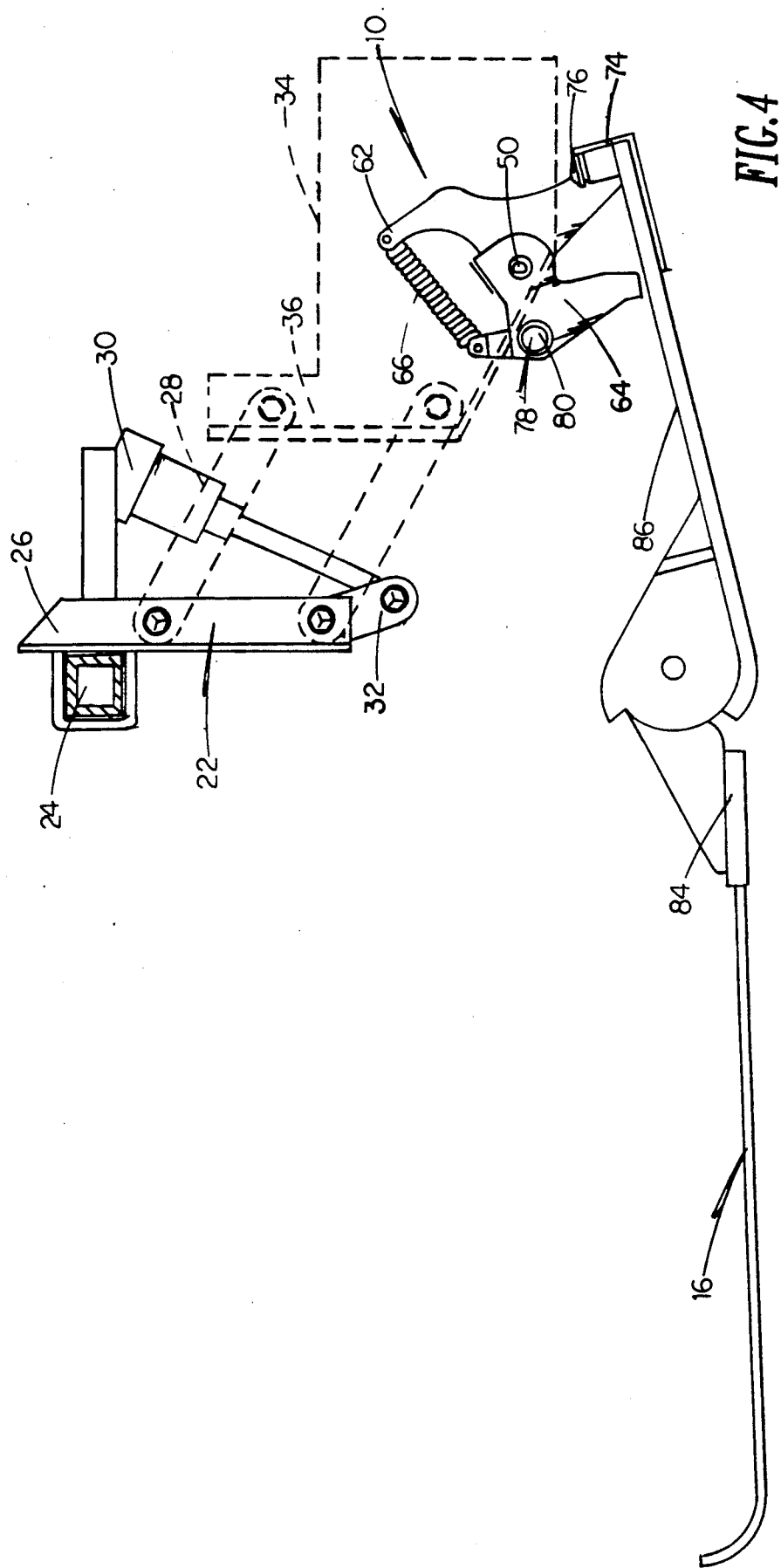
FIG. 4 is a view similar to FIG. 3 but showing the guide rod assembly partially raised and pivoted upwardly prior to the guide rods being pivoted inwardly toward each other to the closed position.

As seen in FIGS. 3-5, the tractor includes a front end mounted lifting mechanism 22 which includes a cross beam 24 mounted on the tractor which in turn has downwardly extending frame members 26 to which parallel lifting arms 28 are connected. An electric actuator 30 is connected to an ear 32 which in turn is connected to the lifting arms 28 for moving the lifting mechanism between lowered and raised positions as seen in FIGS. 3 and 5 respectively.

The guide rod assembly is provided with a support frame in the configuration of a box 34 which has forwardly positioned vertical mounting flanges 36 bolted to the top and bottom parallel lifting arms 28.

A sensor pod assembly 38 is mounted in the box frame 34 by a bolt 40 extending through the sensor pod mounting frame 42 along a pivotal axis 44. The sensor pod assembly 38 includes a mounting ear 46 on which the guide rod assembly 10 is mounted by bolts 48 and 50. The mounting ear 46 is mounted to the lower rotatable sensor pod section 52 which is rotatable relative to the top section 54 for transmitting an electrical signal to a steering guidance system (not a part of this invention). The sensor pod section 52 is rotatable relative to the top section 54 about a generally vertical sensor axis to register pivotal movement of the guide rod assembly. Rotational movement will be on the order of 15° or 7½° either direction from a center line position.

A connecting rod 56 is connected to an ear 58 at one end and to an ear 60 on the lower lifting arm 28 as seen in FIGS. 3–5. Operation of the connecting rod 56 will cause rotation of the sensor pod assembly 38 about the pivotal axis 44 and pivot the guide rod assembly between the horizontal raised position of FIG. 5 to the lowered downwardly extending position of FIG. 3.

The guide rod assembly 10 as seen in FIG. 2 includes a pair of spaced apart mounting plates 62 which as indicated are mounted on the mounting ear 46 of the sensor pod assembly 38. The mounting plates 62 in turn are pivotally connected by the bolt 50 to a pair of spaced apart actuating plates 64. The mounting plates 62 and the actuating plates 64 are interconnected at their top ends by a spring 66 and relative pivotal movement therebetween is limited by an adjustment stop 68. The lower ends of the actuating plates 64 include oppositely extending adjustable tie rods 70 connected to rearwardly extending ears 72 mounted on support arms 74 which in turn are pivotally connected about pins 76 rigidly connected to the mounting plates 62. An actuating stop arm 78 extends through the actuating plates 64 and includes rollers 80 which are positioned to engage laterally extending flanges 82 on opposite sides of the guide rod assembly support frame 34 when the guide rod assembly is pivoted upwardly to the position of FIGS. 4 and 5.

The support arms 74 have pivotally mounted to them guide rods 16 which include forward sections 84 pivotally connected to rear sections 86 in turn pivotally connected to the support arms 74 by laterally extending rod portions 88. Channel shaped plates 90 are placed over the rod end portions 88 to pivotally lock them to the support arms 74. Bolts 92 perform this function. It is seen that the forward end sections 84 of the guide rods 16 are free to pivot in a vertical plane relative to the rear rod sections 86 and the entire rods 16 may pivot vertically relative to the support arms 74. The support arms 74 thus, allow the guide rod to move vertically in response to ground terrain.

In operation it is seen that when the lift mechanism 22 is in its lowered position of FIG. 3, the guide rod assembly 10 is in its downwardly extending operative position with the guide rods 16 in their open parallel position of FIG. 7. Operation of the electric actuator 30 causes the lift arms 28 to pivot upwardly raising the guide rod assembly toward its raised horizontal transport position of FIG. 5. This upward movement causes the ear 60, as seen in FIG. 3, to transmit motion through the connecting rod 56 to the sensor pod assembly 38 to cause it to rotate in a clockwise fashion about the pivot axis 44 thereby pivoting the guide rod assembly 10 upwardly toward the horizontal position of FIG. 5. Once the guide rod assembly 10 reaches the position of FIG. 4, the actuating stop arm 78 engages the stop flanges 82 on the guide rod assembly support frame 34 limiting further upward pivotal movement of the guide rod assembly 10 but allowing continued pivotal movement of the mounting plates 62 which continue to rotate clockwise. The actuating plates 64 are limited against clockwise rotation and thus now begin to rotate counterclockwise about the pivot axis 50 which causes the tie rods 70 to move from the over center position of FIGS. 2 and 7 to the over center position of FIG. 9. In this motion the support arms 74 are pulled inwardly toward each other to the closed transport position of FIG. 9.

When the lift arms 28 start downwardly again, the reverse sequence of movements occur and once the actuating stop arm 78 is free of the flanges 82, the spring 66 will snap the tie rods 70 to the over center position of FIG. 2 and FIG. 7 where the guide rods are in the open parallel position.

It is thus seen that the lifting arms 28 in their several different stages of movement upwardly cause the event just described to occur. The ear 60 connected through the rod 56 to the guide rod assembly 10 may be considered a part of a coordinating means that links the lift arms 28 to the guide rod assembly to cause it to move through its various range of motions in a timed fashion.

What is claimed is:

1. A collapsible guide rod assembly for a tractor guidance system comprising,
   said guide rod assembly including a pair of spaced apart guide rods pivotal between an operative open substantially parallel position to a transport closed collapsed position wherein said rods extend toward each other,
   lifting means for raising and lowering said guide rod assembly, and
   actuation means for pivoting said guide rod assembly between said open and closed positions.

2. The structure of claim 1 wherein a coordinating means is provided between said lifting means and said actuation means for timing the opening and closing of said guide rods with the lowering and raising of said guide rods such that when said guide rods are in said lowered position they are open and when in said raised position they are closed.

3. The structure of claim 2 wherein said lifting means includes a pair of parallel vertically spaced apart lifting arms connected to said guide rod assembly.

4. The structure of claim 2 and said guide rods are pivotally mounted in said guide rod assembly for pivotal movement between a raised horizontal position and a lowered downwardly extending position.

5. The structure of claim 4 wherein said coordinating means provides timing of said pivoting of said guide rod assembly with the raising and lowering of said guide rod assembly such that when said guide rod assembly is in said raised position said guide rods are in said horizontal position and when said guide rod assembly is in said lowered position said guide rods are in said downwardly extending position.

6. A collapsible guide rod assembly for a tractor guidance system comprising,
   a mounting plate means,
   a pair of support arms pivotally connected to said mounting plate means and extending in opposite directions therefrom, each of said support arms including a perpendicular guide rod, said support arms positioned to pivot about a vertical axes between an operative open position with said guide rods being substantially parallel to a transport closed collapsed position wherein said guide rods extend toward each other, an actuation plate means positioned between said pair of support arms and including tie rod means extending in opposite directions into engagement with said support arms at points remote to said vertical axes, and power means operatively connected to said mounting plate means and said actuating plate means to cause relative rotational movement about a first horizontal axis between a first position with said guide rods being in said open position, and a second position with said guide rods being in said closed position.

7. The structure of claim 6 wherein said tie rod means move between oppositely disposed over center positions as said guide rods move between said open and closed positions.

8. The structure of claim 7 wherein a spring means is operatively connected between said mounting plate means and said actuation plate means to bias said guide rods to said open position.

9. The structure of claim 8 and an actuation stop arm is mounted on said actuation plate means and a cooperating stop means is positioned in the line of travel of said stop arm when said actuation plate means is pivoted upwardly, said actuation plate means and said mounting plate means being pivotally interconnected to pivot together about another horizontal pivot axis such that upon said stop arm engaging said stop means said mounting plate means continues pivotal movement about said first horizontal axis and relative to said actuation plate means to cause said actuation plate means to pivot in the opposite direction of said mounting plate means to thereby move said guide rods to said closed position.

10. A collapsible guide rod assembly for a tractor guidance system comprising, a guide rod assembly support frame, a guide rod assembly including mounting plate means pivotally mounted on said support frame for pivotal movement about a first horizontal pivot axis, said assembly including oppositely extending guide rod support arms pivotal about spaced apart vertical axes and having outer ends from which guide rods extend perpendicular to said arms in spaced apart relationship when said guide rods are in an open position, said arms being pivotal to move said guide rods to a closed position in which said guide rods are extending toward each other, an actuating plate means pivotally mounted on said mounting plate for pivotal movement about a second horizontal axis, a pair of tie rod means connected to said actuating plate means and extending in opposite directions for connection to said support arms, an actuating stop arm on said actuating plate means positioned to engage said support frame when said assembly is pivoted about said first pivot axis such that engagement of said stop arm with said support frame allows only said mounting plate means to continue to pivot about said first axis while causing said actuating plate means to pivot in the opposite direction about said second pivot axis and moving said tie rod means from a first over center position when said guide rods are in said open position to a second over center position when said guide rods are in said closed position, and spring means interconnecting said mounting plate means and said actuating plate means to bias said tie rod means to said first over center position with said guide rods in said open position.

11. The structure of claim 10 and said mounting plate means is pivotally connected to said support frame through a sensor means which is pivotal about a generally vertical sensor axis to register pivotal movement of said guide rod assembly about said sensor axis.

12. The structure of claim 10 wherein said guide rods are pivotally connected to said support arms to allow for vertical movement in response to ground terrain.

13. The structure of claim 10 and lift means is connected to said support frame for moving said guide rod assembly between raised and lowered positions and coordinating means operatively connects said mounting plate means to said lift means such that lifting movement causes rotational movement of said mounting plate means about said first axis.

14. A collapsible guide rod assembly for a tractor guidance system comprising, a tractor lifting means moveable between raised and lowered positions, a guide rod assembly operatively connected to said lifting means and including a pair of spaced apart guide rods pivotal between an operative open substantially parallel position to a transport closed collapsed position wherein said guide rods extend toward each other, said pair of guide rods being pivotal between a horizontal position in said raised position to a downwardly extending position when in said lowered position, and coordinating means connecting said lifting means to said pair of guide rods to cause said guide rods when in said lowered downwardly extending position upon being moved upwardly toward said raised position to also begin pivoting upwardly to said horizontal position, and upon reaching said horizontal position continue upward movement toward said raised position causing said guide rods to pivot to said transport closed collapsed position.

* * * * *